(12) United States Patent
Choe et al.

(10) Patent No.: US 11,459,491 B2
(45) Date of Patent: Oct. 4, 2022

(54) STRUCTURAL ADHESIVE COMPOSITION HAVING HIGH ELONGATION AND IMPACT RESISTANCE

(71) Applicant: PUSAN NATIONAL UNIVERSITY INDUSTRY-UNIVERSITY COOPERRATION FOUNDATION, Busan (KR)

(72) Inventors: Young Son Choe, Busan (KR); Joona Bang, Seoul (KR); Jun Soo Moon, Busan (KR)

(73) Assignee: PUSAN NATIONAL UNIVERSITY INDUSTRY-UNIVERSITY COOPERRATION FOUNDATION, Busan (KR)

(*) Notice: Subject to any disclaimer, the term of this patent is extended or adjusted under 35 U.S.C. 154(b) by 561 days.

(21) Appl. No.: 16/496,836

(22) PCT Filed: May 9, 2018

(86) PCT No.: PCT/KR2018/005296
§ 371 (c)(1),
(2) Date: Sep. 23, 2019

(87) PCT Pub. No.: WO2018/208072
PCT Pub. Date: Nov. 15, 2018

(65) Prior Publication Data
US 2020/0255708 A1    Aug. 13, 2020

(30) Foreign Application Priority Data
May 12, 2017 (KR) .......................... 10-2017-0059012

(51) Int. Cl.
| | |
|---|---|
| *C08K 3/013* | (2018.01) |
| *C09J 163/00* | (2006.01) |
| *C08G 18/12* | (2006.01) |
| *C08G 18/32* | (2006.01) |
| *C08G 18/48* | (2006.01) |
| *C08G 18/75* | (2006.01) |
| *C08G 18/76* | (2006.01) |
| *C08K 7/02* | (2006.01) |
| *C08L 21/00* | (2006.01) |
| *C09J 175/08* | (2006.01) |

(52) U.S. Cl.
CPC ............ *C09J 163/00* (2013.01); *C08G 18/12* (2013.01); *C08G 18/3275* (2013.01); *C08G 18/4845* (2013.01); *C08G 18/4854* (2013.01); *C08G 18/755* (2013.01); *C08G 18/7657* (2013.01); *C08K 3/013* (2018.01); *C08K 7/02* (2013.01); *C08L 21/00* (2013.01); *C09J 175/08* (2013.01); *C08L 2205/03* (2013.01)

(58) Field of Classification Search
USPC .......................................... 156/330; 525/523
See application file for complete search history.

(56) References Cited

U.S. PATENT DOCUMENTS

2008/0251202 A1* 10/2008 Eagle .................. C08G 59/066
156/330

FOREIGN PATENT DOCUMENTS

| | | |
|---|---|---|
| JP | 2007-023177 | 2/2007 |
| KR | 10-1997-0059251 | 8/1997 |
| KR | 10-2008-0013991 | 2/2008 |
| KR | 10-2010-0059818 | 6/2010 |
| KR | 10-1222195 | 1/2013 |
| KR | 10-2017-0013353 | 2/2017 |
| WO | WO 2017-044359 | 3/2017 |

OTHER PUBLICATIONS

International Search Report and Written Opinion issued in Corresponding International Patent Application No. PCT/KR2018/005296; dated Oct. 2, 2018.

* cited by examiner

*Primary Examiner* — Terressa Boykin
(74) *Attorney, Agent, or Firm* — Norton Rose Fulbright US LLP

(57) ABSTRACT

A structural adhesive composition having high elongation and impact resistance contains an epoxy resin, a urethane resin formed by using a polyol comprising a long chain as a functional group, and an epoxy curing agent.

8 Claims, No Drawings

STRUCTURAL ADHESIVE COMPOSITION HAVING HIGH ELONGATION AND IMPACT RESISTANCE

CROSS-REFERENCE TO RELATED APPLICATIONS

This application is a national phase under 35 U.S.C. § 371 of International Application No. PCT/KR2018/005296, filed May 9, 2018, which claims the benefit of Korean Patent Application Serial No. 10-2017-0059012, filed May 12, 2017. The contents of the referenced patent applications are incorporated into the present application by reference.

TECHNICAL FIELD

The present disclosure relates to a structural adhesive composition with high elongation and impact-resistance. More specifically, the present disclosure relates to a structural adhesive composition having high elongation and impact-resistance widely used in an automobile or aerospace industry.

BACKGROUND ART

A structural adhesive may be defined as a material that has property to bond high strength materials such as wood, composites or metals such that an adhesive strength of the adhesive exceeds 6.9 MPa (1,000 psi) at room temperature. Such structural adhesive are particularly used in fields requiring high performance in automotive and aerospace industries, and must have high mechanical strength and impact-resistance.

An epoxy resin has many excellent properties compared to other resins such as adhesion ability, heat resistance, chemical resistance, electrical properties, mechanical properties for various substrates, and is used in a wide range of industries. The epoxy resin is an intermediate (prepolymer) of a thermosetting resin, and reacts with a curing agent to form a three-dimensional network structure as a cured product of the epoxy resin showing an inherent properties of an epoxy.

An automotive structural adhesive based on the conventional epoxy resin has high adhesive strength and impact-resistance properties, but has low elongation not suitable for boning heterogeneous materials with different thermal expansion coefficients with each other. An epoxy adhesive for bonding a steel sheet of an automobile structure has excellent impact-resistance properties but has elongation smaller than 5%. Thus, the epoxy adhesive for bonding a steel sheet of an automobile structure does not absorb a dimensional change due to thermal expansion of the material generated by heat curing. In view of the bonding of dissimilar materials, the conventional adhesives may not be suitable for bonding lightweight materials applied to future automobiles.

Further, for the epoxy adhesive, a method of improving the high impact-resistance and adhesion by adding nanoparticles as an additive into an epoxy resin is widely used. The addition of these nanoparticles fails to achieve the elongation suitable for bonding dissimilar materials.

DISCLOSURE

Technical Purposes

One purpose of the present disclosure is to provide a structural adhesive composition that may improve elongation of an epoxy resin while maintaining unique mechanical properties of the epoxy resins and thus may be useful for bonding heterogeneous materials.

Technical Solutions

A structural adhesive composition with high elongation and impact-resistance to achieve one purpose of the present disclosure may include an epoxy resin; an urethane resin formed using a polyol represented by a following Chemical Formula 1; and an epoxy curing agent:

[Chemical Formula 1]

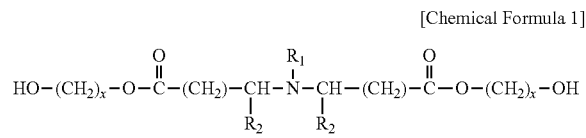

In the Chemical Formula 1, x represents an integer of 2 to 10, $R_1$ is a functional group represented by a following Chemical Formula 1-a or 1-b, and $R_2$ represents a hydrogen atom or a methyl group:

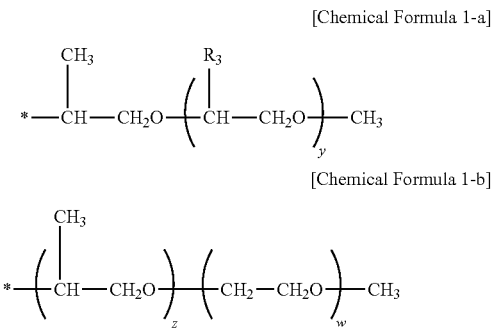

In the Chemical Formula 1-a, y represents an integer of 10 to 100, $R_3$ represents a hydrogen atom or a methyl group, and each of z and w in the Chemical Formula 1-b independently represents an integer of 5 to 100.

In one embodiment, the urethane resin may be formed using at least one of polypropylene glycol (PPG) or polytetramethylene ether glycol (PTMEG) together with the polyol represented by the Chemical Formula 1.

In one embodiment, the structural adhesive composition with the high elongation and impact-resistance may further contain at least one of rubber particles or microfibers. Further, the structural adhesive composition with the high elongation and impact-resistance may further contain a modified epoxy resin, an adhesion promoter, a filler and a catalyst.

In one embodiment, the urethane resin may have a star-shape structure.

In one embodiment, the urethane resin may be prepared by reacting an isocyanate, an chain extender and a terminal blocking compound with the polyol represented by the Chemical Formula 1. In this connection, the chain extender may be a compound of a monomolecular structure with at least three hydroxyls.

In one embodiment, when the structural adhesive composition further contains rubber particles, micro fibers, a modified epoxy resin, an adhesion promoter, a filler and a catalyst, a content of the epoxy resin is in a range of 15 to 70 wt % based on a total weight of the compound; a content of the modified epoxy resin is in a range of 5 to 15 wt % based on a total weight of the compound; a content of the urethane resin is in a range of 10 to 70 wt % based on a total weight of the compound; a content of the filler is in a range of 2 to 10 wt % based on a total weight of the compound; a content of the rubber particles is in a range of 2 to 15 wt % based on a total weight of the compound; a content of the micro fibers is in a range of 0.5 to 10 wt % based on a total weight of the compound; a content of the epoxy curing agent is in a range of 4 to 7 wt % based on a total weight of the compound; a content of the catalyst is in a range of 0.1 to 1 wt % based on a total weight of the compound; and a content of the adhesion promoter is in a range of 0.1 to 0.5 wt % based on a total weight of the compound.

Technical Effects

According to the structural adhesive composition with high elongation and impact-resistance in accordance with the present disclosure as described above, the combination of the urethane resin having the high elongation and the appropriate epoxy resin may allow the structural adhesive to have improved adhesion and impact-resistance properties while having high elongation. The polyol used to prepare the urethane resin used in accordance with the present disclosure contains a flexible and polarity-controlled chain as a functional group. Thus, the functional group may be introduced to a branched chain of an urethane main structure. This may secure the flexibility of the structural adhesive composition prepared using the urethane resin and at the same time, improve the adhesive strength by controlling the polarity. Further, the structural adhesive composition may further contain the rubber particles thereby to further improve elongation thereof. A balanced combination between the urethane resin, epoxy resin and rubber particles may further improve the adhesion ability and impact-resistance.

The urethane resin contained in the structural adhesive composition according to the present disclosure may have a variable polarity and thus may achieve the flexibility and adhesion ability of the structural adhesive composition at the same time. Thus, the structural adhesive composition may be widely used for bonding different materials or multiple materials with each other in the automotive structure or aerospace industry.

DETAILED DESCRIPTIONS

Hereinafter, embodiments of the present disclosure will be described in detail.

The present disclosure may be modified in various ways and may have various forms. Specific embodiments are illustrated in the drawings and described in detail herein. However, the specific embodiments are not intended to limit the present disclosure to any particular form. The present disclosure should be understood to contain all changes, equivalents, and substitutions that fall within the spirit and scope of the present disclosure. In describing the drawings, similar reference numerals are used for similar elements.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The structural adhesive composition with high elongation and impact-resistance according to the present disclosure contains an epoxy resin, an urethane resin and an epoxy curing agent, where the urethane resin is formed using a polyol represented by a following Chemical Formula 1:

[Chemical Formula 1]

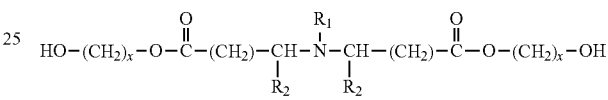

in the Chemical Formula 1, x represents an integer of 2 to 10, $R_1$ represents a functional group represented by a following Chemical Formula 1-a or 1-b, $R_2$ represents a hydrogen atom or a methyl group:

[Chemical Formula 1-a]

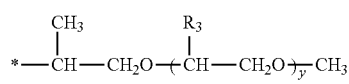

[Chemical Formula 1-b]

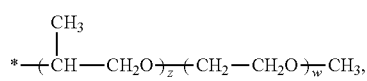

in the Chemical Formula 1-a, y represents an integer of 10 to 100, $R_3$ represents a hydrogen atom or a methyl group, in the Chemical Formula 1-b, each of z and w independently represents an integer of 5 to 100.

In the urethane resin formed by using the polyol represented by the Chemical Formula 1, the polyol contains the functional group $R_1$ represented by the Chemical Formula 1-a or 1-b. Thus, a flexible and polarity-controlled chain may be introduced to a branched chain of the urethane main structure, thereby improving the adhesive strength by controlling the polarity while ensuring flexibility. $R_1$ expressed as the Chemical Formula 1-a or 1-b may contain ethylene oxide and propylene oxide chains alone or in a mixed form to the main chain. Thus, the polarity of $R_1$ may be controlled based on contents of the two chains, that is, the hydrophilic and hydrophobic chains, and has very flexible properties due to the chain structure.

Further, the urethane resin formed using the polyol represented by the Chemical Formula 1 in accordance with the present disclosure may have a star-shaped structure. As the urethane resin has the star shaped structure, there is an advantage that the urethane resin may be uniformly dispersed in the medium of the epoxy resin.

In an embodiment, when the functional group $R_1$ represented by the Chemical Formula 1-b, z: was a ratio between z and w may be in a range of 1:15 to 10:1.

The polyol represented by the Chemical Formula 1 may be prepared according to a following Reaction Formula 1:

[Reaction Formula 1]

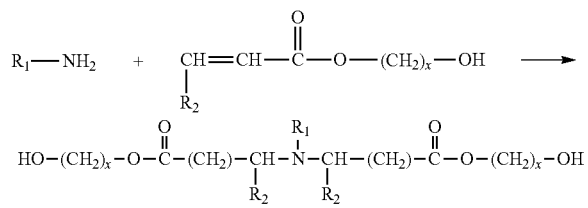

According to the Reaction Formula 1, a weight average molecular weight of polyethermonoamine ($R_1$—$NH_2$) used as a starting material may be in a range of 500 to 5,000. Preferably, the weight average molecular weight of the polyethermonoamine may be in a range of 1,000 to 3,000.

The urethane resin may be prepared by using the polyol represented by the Chemical Formula 1 together with at least one of polypropylene glycol (PPG) or polytetramethylene ether glycol (PTMEG). A molecular weight of each of PPG and PTMEG may be in a range of 400 to 2,000. Using the PPG may improve the impact-resistance of the product at room temperature. PTMEG may improve the impact-resistance of the product at low temperatures. Thus, the content and ratio of PPG and/or PTMEG may be adjusted according to the use environment of the structural adhesive.

In one embodiment, when using all of the polyol represented by the Chemical Formula 1, and PPG and PTMEG in the preparation of the urethane resin, a content of the polyol represented by the Chemical Formula 1 may be in a range of 2 to 30 wt % based on a total weight of the polyol represented by the Chemical Formula 1, and PPG and PTMEG. When the content of the polyol represented by the Chemical Formula 1 is smaller than 2 wt %, there is little effect on improving the elongation of the structural adhesive. When the content of the polyol represented by the Chemical Formula 1 exceeds 30 wt %, there is a problem that the overall mechanical properties of the adhesive composition is lowered. Thus, it may be preferable that the content of the polyol represented by the Chemical Formula 1 may be in a range of 2 to 30 wt % based on a total weight of the polyol represented by the Chemical Formula 1, and PPG and PTMEG.

The urethane resin contained in the structural adhesive composition according to the present disclosure may be obtained by reacting the polyol as described above with an isocyanate compound, an chain extender and a terminal blocking compound.

Examples of the isocyanate compounds may include isophorone diisocyanate (IPDI), methylene diphenyl diisocyanate (MDI), 1,4-pentamethylene diisocyanate (1,4-PDI), 4,4'-methylene bis-(cyclohexyl isocyanate) (HMDI), and the like. These may be used individually or in combination of 2 or greater thereof.

The chain extender may shape the structure of the urethane resin into a star shape. The chain extender may include a compound of a monomolecular structure containing at least three hydroxyl groups. An example of the chain extender may include trimethylolpropane, ditriethylolpropane, or the like. These may be used alone or in combination of two or greater thereof.

A content of the chain extender may be in a range of 0.1 to 10 phr based on the total polyol content. When the content of the chain extender is greater than 10 phr, a viscosity of the synthesized urethane resin increases rapidly, which makes it difficult to control the synthesized urethane resin.

The terminal blocking compound may include 4-tert butylphenol.

The urethane resin contained in the structural adhesive composition according to the present disclosure as described above may be formed by mixing the polyol represented by the Chemical Formula 1 and as prepared according to the Reaction Formula 1 with other polyols such as PPG and PTMEG and then reacting the mixture with the chain extender, isocyanate compound and terminal blocking compound.

A content of the urethane resin may be in a range of 10 to 70 wt % based on a total weight of the structural adhesive composition. The content of the urethane resin should be at least 10 wt % to improve elongation of the structural adhesive composition using the urethane resin. When the content of the urethane resin exceeds 70 wt %, there is a problem that the mechanical properties of the structural adhesive composition are rather severely reduced. Thus, the content of the urethane resin may be in a range of 10 to 350 parts by weight based on 100 parts by weight of the epoxy resin.

The epoxy resin used in the structural adhesive composition of the present disclosure may include a liquid epoxy resin which may contain bisphenol-A derived epoxy resin. In addition, the epoxy resin may further include a chelate substituted functional epoxy resin and/or a reactive diluent together with the bisphenol-A derived epoxy resin. The functional epoxy resin may be liquid. A content of the epoxy resin may be in a range of 15 to 70 wt % based on a total weight of the structural adhesive composition.

The epoxy curing agent may be a curing agent capable of thermally curing the epoxy resin at high temperatures. The epoxy curing agent may include a curing agent capable of thermally curing the epoxy resin at a temperature of at least 100° C. or higher. For example, dicyan diamide may be used as the epoxy curing agent. A content of the epoxy curing agent may be in a range of 4 to 7 wt % based on the total weight of the structural adhesive composition.

The structural adhesive composition according to the present disclosure may further contain rubber particles and/or microfibers in addition to the epoxy resin, the urethane resin and the epoxy curing agent.

The rubber particles may include acrylic rubber particles. The rubber particles have a property of high compatibility with the epoxy resin and the urethane resin. A content of the rubber particles may be in a range of 2 to 15 wt % based on the total weight of the structural adhesive composition. When the content of the rubber particles is greater than 15 wt %, there is a problem that agglomeration between the rubber particles may occur.

The microfiber may be a fiber made of polyethylene and may be mixed with the urethane resin to improve adhesion and impact-resistance of the structural adhesive composition. A fiber length of the microfiber may be in a range of 50 μm to 1,000 μm. When the fiber length exceeds 1,000 μm, it is not preferable because of the viscosity rise. A content of the microfibers may be in a range of 0.5 to 10 wt % based on the total weight of the structural adhesive composition.

When the content of the microfibers exceeds 10 wt %, there may be a problem that the viscosity of the composition rises sharply.

Further, the structural adhesive composition according to the present disclosure may further contain a modified epoxy resin, other fillers and/or catalyst.

The modified epoxy resin itself refers to a flexible epoxy resin, and may act as a component that aids the function of the modified urethane resin. A content of the modified epoxy resin may be in a range of 5 to 15 wt % based on the total weight of the structural adhesive composition. When the content of the modified epoxy resin exceeds 15 wt %, the mechanical strength of the structural adhesive may decrease.

Metal oxide particles may be used as the filler. The fillers may be used as an adhesion promoter. Further, the catalyst may include imidazole. A content of the filler may be in a range of 2 to 10 wt % based on the total weight of the structural adhesive composition. Further, a content of the catalyst may be in a range of 0.1 to 1 wt % based on the total weight of the structural adhesive composition. As a separate adhesion promoter, an epoxy functional silane may be used. In this connection, a content of the adhesion promoter may be in a range of 0.1 to 0.5 wt % based on the total weight of the structural adhesive composition.

Interposing the structural adhesive composition according to the present disclosure between the two substrates and applying heat thereto may allow the two substrates to be firmly bonded to each other without a separate member. In this connection, the two substrates may be made of different materials or may be made of the same material as each other. In particular, each of the substrates may be made of metal. In particular, the structural adhesive composition according to the present disclosure has excellent adhesion ability in a bonding process including a curing step at a relatively high temperature of 150 to 180° C. Such a structural adhesive composition may satisfy both the high adhesion ability and impact-resistance required in the automotive or aviation industry and may be widely used in the field.

Hereinafter, the present disclosure will be described in more detail based on specific preparation examples and property evaluation results of samples prepared accordingly.

Preparation Example: Preparation of Polyol Represented by Chemical Formula 1

A total weight of polyethermonoamine represented by a following Chemical Formula 2 and hydroxyethyl methacrylate was adjusted to 100 g in an equivalent ratio. Then, polyethermonoamine represented by the following Chemical Formula 2 and hydroxyethyl methacrylate were placed in a reactor on a thermostat. Vacuum was applied thereto for 1 hour and two drops of triethyl amine were added to the reactor and a reaction was continued for 24 hours while maintaining the temperature at 45° C. The reaction was completed to obtain a liquid polyol being transparent and having viscosity.

[Chemical Formula 2]

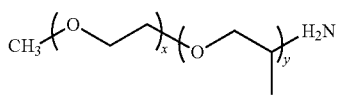

A weight average molecular weight of the compound represented by the Chemical Formula 2 was 2,000, and a ratio of x and y was 5:5.

Synthesis of Urethane Resin 80 g of PPG: PTMEG (5:5, molecular weight 1,000) was placed in a five-necked flask while maintaining at 70° C. Thereafter, 20 g of the polyol as synthesized above was further added to the flask, and vacuum was applied thereto for 1 hour. Thereafter, 40 g of IPDI and 2 g of trimethylolpropane were slowly injected thereto while maintaining the temperature at 60° C. When a reaction proceeded, the temperature was maintained below 80° C. for 2 hours. Then, 5 g of 4-tert butylphenol were injected thereto and the reaction was further maintained for 4 hours. After completion of the reaction, a viscous transparent liquid urethane resin was obtained.

Preparation of Structural Adhesive Composition

A structural adhesive composition according to the present disclosure was prepared by mixing components according to a following Table 1 with the urethane resin as prepared above.

An adhesive composition was prepared by mixing the urethane resin as prepared above with an epoxy resin, rubber particles, urethane resin, modified epoxy resin, adhesion promoter, filler, curing agent and catalyst. As the epoxy resin, bisphenol-A derived epoxy resin YD-128 (trade name, Kukdo Chemical, Korea) and reactive diluent PG-207 (trade name, Kukdo Chemical, Korea) were used. F351 (trade name, Zeon) was used as the rubber particles. XP3511 (trade name, STRUKTOL) was used as the modified epoxy resin. A-187, an epoxy functional silane was used as the adhesion promoter. CaO and $SiO_2$ were used as the fillers, and DICY (dicyan diamide) was used as the curing agent. A content unit of each component in the following Table 1 is "wt %".

TABLE 1

| Components | | Products | | | | | | |
|---|---|---|---|---|---|---|---|---|
| Type | Materials | 1 | 2 | 3 | 4 | 5 | 6 | 7 |
| Epoxy resin | YD-128 | 38 | 34 | 30 | 24 | 20 | 14 | 10 |
| Diluent | PG-207 | 5 | 5 | 5 | 5 | 5 | 5 | 5 |
| Rubber particles | F351 | 12 | 12 | 12 | 12 | 12 | 12 | 12 |
| PE microfiber | SYLOTHIX | 0 | 4 | 8 | 4 | 8 | 4 | 8 |
| Urethane resin | | 30 | 30 | 30 | 40 | 40 | 50 | 50 |
| Modified epoxy | 3511 | 15 | 15 | 15 | 15 | 15 | 15 | 15 |
| Adhesion promoter | A-187 | 0.5 | 0.5 | 0.5 | 0.5 | 0.5 | 0.5 | 0.5 |
| Filler | CaO | 3 | 3 | 3 | 3 | 3 | 3 | 3 |
|  | $SiO_2$ | 2 | 2 | 2 | 2 | 2 |  | 2 |
| Curing agent | DICY | 5 | 5 | 5 | 5 | 5 |  | 5 |
| Catalyst | Imidazole | 0.5 | 0.5 | 0.5 | 0.5 | 0.5 | 0.5 | 0.5 |

Property Evaluation of Products

Each of the products prepared as described above was applied to a specimen for measuring a lap shear strength of a steel sheet and was heat cured at 180° C. for 20 minutes. After the heat curing, the lap shear strength, T-peel strength and Impact-peel strength were measured, respectively. The results are shown in Table 2 below.

TABLE 2

| Properties | Products | | | | | | |
|---|---|---|---|---|---|---|---|
| | 1 | 2 | 3 | 4 | 5 | 6 | 7 |
| Lap shear strength (MPa) | 30 | 32 | 32 | 25 | 27 | 20 | 21 |
| T-peel strength (N/25 mm) | 280 | 284 | 297 | 250 | 254 | 212 | 231 |
| Impact-peel strength (N/mm) 23° C. | 48 | 47 | 52 | 43 | 41 | 39 | 34 |
| Elongation(%) | 8.1 | 8.5 | 8.6 | 11 | 12.4 | 18.3 | 20.5 |

Referring to Table 2, when a product has the elongation of a low value, it may be seen that the product exhibits a high lap shear strength and T-peel strength. Further, it may be confirmed that as the adhesion decreases, the impact-peel strength decreases at the same tendency. That is, the synthesized flexible urethane resin plays a decisive role to obtain the high elongation in the structural adhesive composition according to the present disclosure. The elongation is higher when the microfiber is introduced as in the products 2 to 7, compared to a case in which the microfiber is not used as in the product 1.

Although the present disclosure has been described above with reference to the preferred embodiments of the present disclosure, those skilled in the art will appreciate that various modifications and changes may be made in the present disclosure without departing from the spirit and scope of the present disclosure set forth in the following claims.

What is claimed is:

1. A structural adhesive composition having high elongation and impact-resistance, the composition comprising:
    an epoxy resin;
    an urethane resin formed using a polyol represented by a following Chemical Formula 1; and
    an epoxy curing agent:

[Chemical Formula 1]

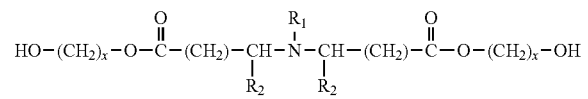

wherein, in the Chemical Formula 1, x represents an integer of 2 to 10,
$R_1$ represents a functional group represented by a following Chemical Formula 1-a or 1-b,
$R_2$ represents a hydrogen atom or a methyl group:

[Chemical Formula 1-a]

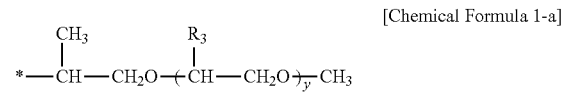

[Chemical Formula 1-b]

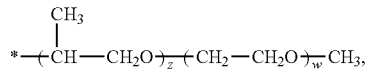

wherein, in the Chemical Formula 1-a, y represents an integer of 10 to 100, $R_3$ represents a hydrogen atom or a methyl group,
wherein in the Chemical Formula 1-b, each of z and w independently represents an integer of 5 to 100.

2. The structural adhesive composition of claim 1, wherein the urethane resin is formed using at least one of polypropylene glycol (PPG) or polytetramethylene ether glycol (PTMEG) together with the polyol represented by the Chemical Formula 1.

3. The structural adhesive composition of claim 1, wherein the structural adhesive composition further comprises at least one of rubber particles or microfibers.

4. The structural adhesive composition of claim 3, wherein the structural adhesive composition further comprises a modified epoxy resin, an adhesion promoter, a filler and a catalyst.

5. The structural adhesive composition of claim 1, wherein the urethane resin has a star-shaped structure.

6. The structural adhesive composition of claim 1, wherein the urethane resin is prepared by reacting an isocyanate, a chain extender and a terminal blocking compound with the polyol represented by the Chemical Formula 1.

7. The structural adhesive composition of claim 6, wherein the chain extender includes a compound of a monomolecular structure with at least three hydroxyls.

8. The structural adhesive composition of claim 1, wherein the structural adhesive composition further contains rubber particles, microfibers, a modified epoxy resin, an adhesion promoter, a filler and a catalyst,
    wherein a content of the epoxy resin is in a range of 15 to 70 wt % based on a total weight of the compound;
    a content of the modified epoxy resin is in a range of 5 to 15 wt % based on a total weight of the compound;
    a content of the urethane resin is in a range of 10 to 70 wt % based on a total weight of the compound;
    a content of the filler is in a range of 2 to 10 wt % based on a total weight of the compound;
    a content of the rubber particles is in a range of 2 to 15 wt % based on a total weight of the compound;
    a content of the microfibers is in a range of 0.5 to 10 wt % based on a total weight of the compound;
    a content of the epoxy curing agent is in a range of 4 to 7 wt % based on a total weight of the compound;
    a content of the catalyst is in a range of 0.1 to 1 wt % based on a total weight of the compound; and
    a content of the adhesion promoter is in a range of 0.1 to 0.5 wt % based on a total weight of the compound.

* * * * *